Feb. 11, 1930.  C. T. HATCH  1,746,530
COATING MACHINE
Filed Feb. 13, 1928   2 Sheets-Sheet 1

INVENTOR
Charles T. Hatch
BY Chappell & Earl
ATTORNEYS

Feb. 11, 1930.　　　C. T. HATCH　　　1,746,530
COATING MACHINE
Filed Feb. 13, 1928　　2 Sheets-Sheet 2

INVENTOR
Charles T. Hatch
BY Chappell Earl
ATTORNEYS

Patented Feb. 11, 1930

1,746,530

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

COATING MACHINE

Application filed February 13, 1928. Serial No. 254,136.

My present improvements relate to the type of coating machine illustrated in my application for Letters Patent filed May 1, 1926, Serial No. 106,025 and is in some respects an improvement upon and adaptation of the structure there illustrated.

The main objects of this invention are to provide an improved mounting and air delivery means for the atomizing nozzles whereby the nozzles are supported for an oscillating movement to deliver the coating material, such as grease, to the inside of a pan or the light.

Objects relating to details and economies of my invention will appear from the detailed description to follow. The invention is defined and pointed out in the claims.

A structure which is a preferred embodiment of my invention is illustrated in the accompanying drawing, in which.

Figure 1:
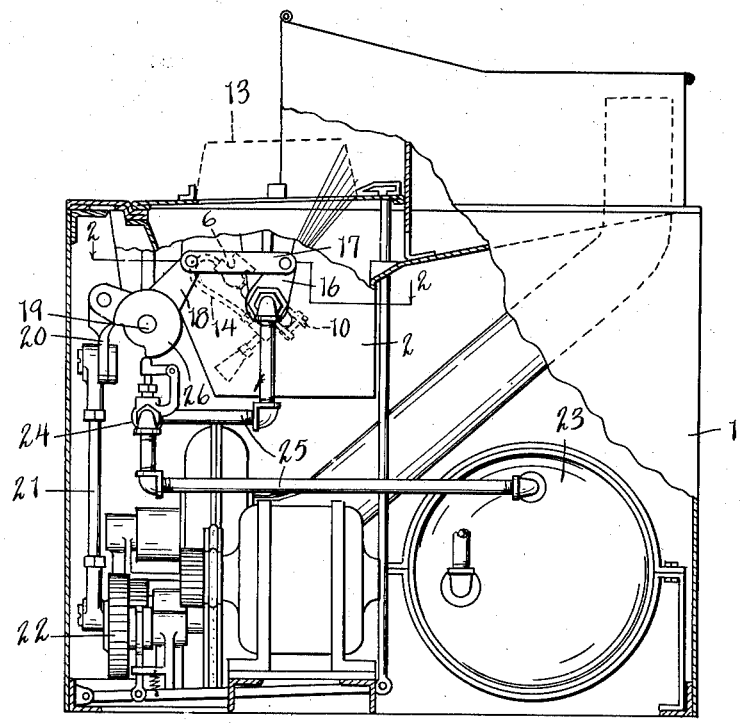
Fig. 1 is a fragmentary end elevation of a coating machine embodying the features of my invention.
Figure 2:
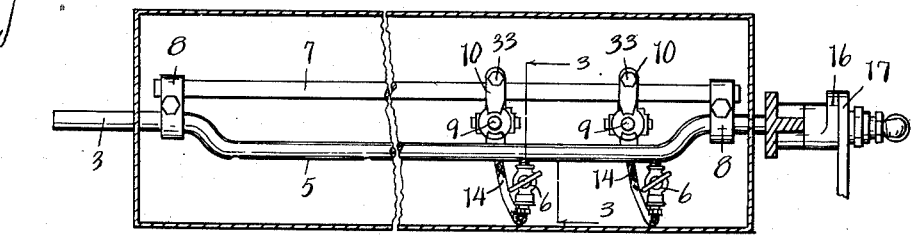
Fig. 2 is a detail view in horizontal section on line 2—2 of Fig. 1.
Figure 3:
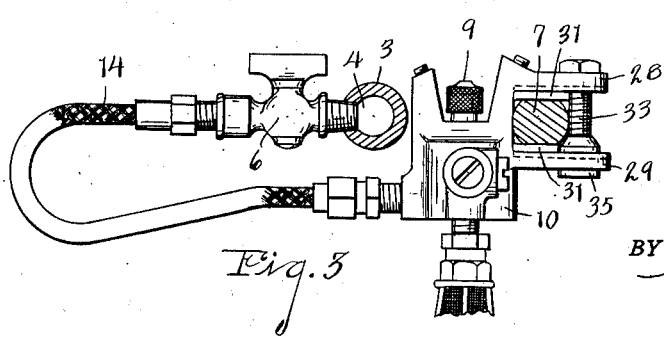
Fig. 3 is an enlarged detail mainly in section on a line corresponding to line 3—3 of Fig. 2.

Referring to the drawing, I provide a cabinet designated generally by the numeral 1 of such dimensions as to house the main parts of the machine. At the upper part of the housing, I support a tank 2 for grease such as lard or other suitable material. In practice this tank is provided with a heating means, none however being illustrated in this application.

Across this tank I mount a rockshaft 3 which is tubular to provide an air conduit or passage 4. This rockshaft has a crank-like offset 5 on which is mounted a plurality of individual air delivery valves 6. A nozzle supporting bar 7 is mounted on the rockshaft by means of clamps 8 which support the bar in opposed relation to the offset of the rockshaft and in offset relation to the axial center of the rockshaft.

A plurality of nozzles 9 are adjustably mounted on this bar 7 so that they may be adjusted in proper relation to deliver to the particular article being coated, as a pan or series of pans indicated by the dotted lines at 13 of Fig. 1.

The nozzles are connected by the flexible air conduits 14 leading from the valves to the nozzles. The valves enable the cutting off of one or more of the nozzles as may be desired or the adjustment of air delivered thereto. The nozzles have coating material intakes 15 depending into the tank. By mounting the nozzles so that their tips are in approximately the axial center of the rockshaft, their delivery relation relative to the article being coated is maintained throughout their oscillation or stroke.

The rockshaft is provided with an arm 16 which is connected by a link 17 to an arm of a bell crank lever 18 on a rockshaft 19. The other arm of this bell crank lever is connected by the link 20 and pitmen 21 to a driving means indicated generally by reference numeral 22. As this mechanism is fully described in my said application, it is not set forth herein.

The delivery of air to the crank shaft conduit from the supply tank 23 is controlled by a valve 24 interposed in the piping 25, this valve being controlled from a cam 26 on the rockshaft 19 so that the valve is open to deliver air under pressure during the oscillation of the rockshaft 3.

Figure 4:
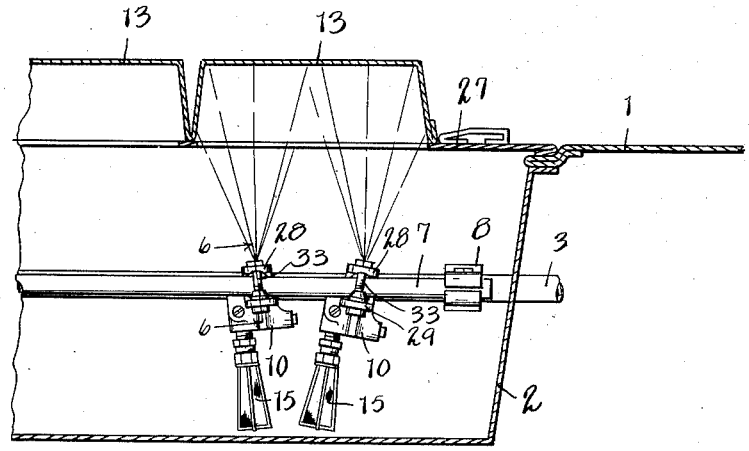
Fig. 4 is a detail section illustrating the adjustable features of the nozzles.
Figure 5:
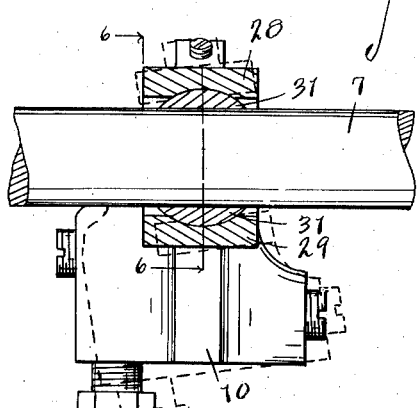
Fig. 5 is a detail view partially in section on line 5—5 of Fig. 6 illustrating the details of the nozzle adjusting and clamping means.
Figure 6:
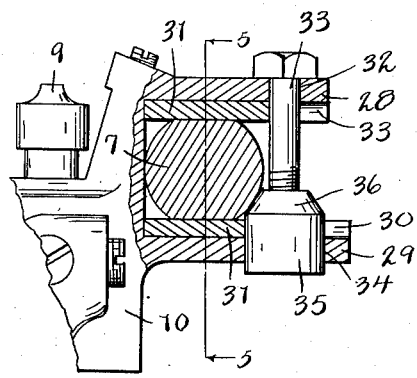
Fig. 6 is a detail view partially in section on line 6—6 of Figs. 4 and 5.

The nozzle body members are supported for tilting as well as lateral adjustment, the details of this mechanism being shown in Figs. 4, 5 and 6. The purpose is that the spray may be delivered uniformly to the pans which are frequently of different sizes and dimensions. The pan supporting table 27 is designed to support the particular pans, a table being provide for pans of different sizes or the table may be provided with adapters.

To accomplish this the body members 10 of the nozzles are provided with spaced arms 28 and 29 embracing the bar 7 which preferably has flattened opposed sides. The arms 28 and 29 have opposed cylindrical longitudinal grooves 30 therein adapted to rockingly support the adjusting blocks 31 which are curved on their outer sides to rock in the grooves 30. The upper arm 28 has a hole 32 therein adapted to receive the screw 33 while the lower arm has an alined hole 34 for the clamping member 35 into which the clamping screw is threaded. This member 35 has a conical top portion 36 which engages the bar 7 thereby clamping the nozzles firmly in their adjusted positions so that they may not only be adjusted longitudinally of the bar but may be tilted to deliver the spray in the most effective manner to the pans to cover the entire surface thereof so that upon rocking or oscillating the nozzles a very uniform coating is secured.

By this arrangement of parts the nozzles may be adjusted as desired and the oscillation thereof does not flex or bend the conduits as is the case in the embodiment shown in my said application for Letters Patent.

I have illustrated and described my improvements in an embodiment which I have found highly satisfactory. I have not attempted to illustrate or describe certain modifications or adaptations which I contemplate as it is believed that this disclosure will enable those skilled in the art to embody or adapt my improvements as may be desired.

Having thus described my invention, what I claim as new and desire to secure by Letters Patent, is:

1. In a structure of the class described, the combination of a tank, a tubular rockshaft constituting an air conduit disposed across the tank, said rockshaft having a crank-like offset, a nozzle supporting bar mounted on said rockshaft in opposed relation to said offset and in offset relation relative to the axis of said rockshaft, a plurality of nozzles adjustably mounted on said supporting bar with their tips in approximately the axial center of the rockshaft, said nozzles being provided with intakes depending into said tank, valves mounted on said rockshaft in communication with the air conduit thereof, flexible connections from said valve to said nozzles, an air supply valve controlling the delivery of air to said rockshaft conduit, and means for actuating said rockshaft operatively associated with said air supply valve.

2. In a structure of the class described, the combination of a tank, a tubular rockshaft constituting an air conduit disposed across the tank, said rockshaft having a crank-like offset, a nozzle supporting bar mounted on said rockshaft in opposed relation to said offset and in offset relation relative to the axis of said rockshaft, a plurality of nozzles mounted on said supporting bar, said nozzles being provided with intakes depending into said tank, air delivery connections from said conduit to said nozzles, an air supply valve controlling the delivery of air to said rockshaft conduit, and means for actuating said rockshaft operatively associated with said air supply valve.

3. In a structure of the class described, the combination of a tank, a tubular rockshaft constituting an air conduit disposed across the tank, said rockshaft having a crank-like offset, a nozzle supporting bar mounted on said rockshaft in opposed relation to said offset and in offset relation relative to the axis of said rockshaft, a plurality of nozzles adjustably mounted on said supporting bar with their tips in approximately the axial center of the rockshaft, said nozzles being provided with intakes depending into said tank, valves mounted on said rockshaft in communication with the air conduit thereof, and flexible connections from said valve to said nozzles.

4. In a structure of the class described, the combination of a tank, a tubular rockshaft constituting an air conduit disposed across the tank, said rockshaft having a crank-like offset, a nozzle supporting bar mounted on said rockshaft in opposed relation to said offset and in offset relation relative to the axis of said rockshaft, a plurality of nozzles mounted on said supporting bar, said nozzles being provided with intakes depending into said tank, and air delivery connections from said conduit to said nozzles.

5. In a structure of the class described, the combination of a rockshaft constituting an air conduit and having an offset therein, a support mounted on said rockshaft in opposed relation to said offset and in offset relation to the axis thereof, a nozzle adjustably mounted on said support with its tip in approximately the axial center of said rockshaft, and a flexible air conduit for said air conduit to said rockshaft.

6. In a structure of the class described, the combination of a rockshaft constituting an air conduit and having an offset therein, a support mounted on said rockshaft in opposed relation to said offset and in offset relation to the axis thereof, a nozzle adjustably mounted on said support, and a flexible air conduit for said air conduit to said rockshaft.

7. In a structure of the class described, the combination of a rockshaft constituting an air conduit having an offset therein, a support mounted on said rockshaft in opposed relation to said offset and in offset relation to the axis thereof, a nozzle mounted on said support, and an air conduit from said air conduit to said nozzle.

8. In a structure of the class described, the combination of a rockshaft adapted as an air conduit, a plurality of air nozzles adjustably mounted on said rockshaft, said conduit having a plurality of independent outlet valves, flexible air conduits from said valves to said nozzles, an air supply valve controlling the delivery of air to said rockshaft, and means for actuating said rockshaft operatively associated with said air supply valve.

9. In a structure of the class described, the combination of a tank, a tubular rockshaft constituting an air conduit disposed across said tank, a nozzle supporting bar mounted on said rockshaft, a plurality of nozzles adjustably and tiltably mounted on said supporting bar, said nozzles being provided with intakes depending into said tank, flexible air conduits connecting said nozzle to said rockshaft, and a pan support above said tank.

10. In a structure of the class described, the combination of a rockshaft constituting an air conduit and having an offset therein, a support mounted on said rockshaft in opposed relation to said offset and in offset relation to the axis thereof, a plurality of nozzles tiltably mounted on said support, and flexible air conduits connecting said rockshaft conduit to said nozzle, said conduits being provided with independent valves.

11. In a structure of the class described, the combination of a rockshaft constituting an air conduit and having an offset therein, a support mounted on said rockshaft in opposed relation to said offset and in offset relation to the axis thereof, a plurality of nozzles tiltably mounted on said support and flexible air conduits connecting said rockshaft conduit to said nozzle.

12. In a structure of the class described, the combination of a supporting bar having opposed flattened sides, a nozzle member having arms spaced to embrace said supporting bar, said arms having longitudinal grooves in their inner sides and opposed openings adjacent their outer ends, adjusting members disposed to engage the flattened sides of said supporting bar and cylindrically curved on their outer sides to rockingly engage said grooves in said arms, a clamp member disposed in the opening in one of said arms and having a conical portion engaging said supporting bar, and a clamping bolt disposed through the opening in the other arm and having threaded engagement with said clamp member.

13. In a structure of the class described, the combination of a supporting bar, a nozzle member having arms spaced to embrace said supporting bar, said arms having longitudinal grooves in their inner sides and opposed openings adjacent their outer ends, adjusting members cylindrically curved on their outer sides to rockingly engage said grooves in said arms, a clamp member disposed in the opening in one of said arms to engage said supporting bar, and a clamping bolt disposed through the opening in the other arm and having threaded engagement with said clamp member.

14. In a structure of the class described, the combination of a supporting bar, a nozzle member having arms spaced to embrace said supporting bar, said arms having opposed openings adjacent their outer ends, one of said arms having a groove in its inner side, an adjusting member rockingly mounted in said groove to engage said supporting bar, a clamping member disposed in the opening in one of said arms and having a conical portion engaging said supporting bar, and a clamping bolt disposed through the opening in the other arm and having threaded engagement with said clamp member.

15. In a structure of the class described, the combination of a supporting bar, a nozzle member having arms spaced to embrace said supporting bar, said arms having opposed openings adjacent their outer ends, an adjusting member rockingly mounted on one of said arms to engage said supporting bar, a clamping member disposed in the opening in one of said arms to engage said supporting bar, and a clamping bolt disposed through the opening in the other arm and having threaded engagement with said clamp member.

16. In a structure of the class described, the combination of an article support, a rockshaft adapted as an air conduit disposed in a plane substantially parallel with the plane of said support, means for oscillating said rockshaft, an air nozzle adjustably mounted on said rockshaft, and a flexible air connection from said conduit to said nozzle.

17. In a structure of the class described, the combination of a tank, a rockshaft constituting an air conduit disposed across said tank, a plurality of nozzles mounted on said rockshaft for adjustment longitudinally thereof, said nozzles being provided with intakes depending into said tank, flexible air conduits connecting said nozzles to said rockshaft, and a pan support above said tank.

18. In a structure of the class described, the combination of a rockshaft constituting an air conduit, a plurality of nozzles mounted on said rockshaft for adjustment longitudinally thereof, flexible air conduits for said rockshaft conduit to said nozzles, said conduits being provided with independent valves, means for actuating said rock shaft, and means for supporting articles to be coated in a plane substantially parallel to the plane of said rockshaft.

19. In a structure of the class described, the combination of a rockshaft constituting an air conduit, a plurality of nozzles mounted on said rockshaft for adjustment longitudinally thereof, flexible air conduits for said rockshaft conduit to said nozzles, means for actuating said rockshaft, and means for supporting articles to be coated in a plane substantially parallel to the plane of said rockshaft.

In witness whereof I have hereunto set my hand.

CHARLES T. HATCH.